United States Patent [19]

Usui

[11] 4,261,769
[45] Apr. 14, 1981

[54] HIGH PRESSURE FUEL INJECTION TUBING MATERIAL

[75] Inventor: Masayoshi Usui, Numazu, Japan

[73] Assignee: Usui Kokusai Sangyo Kabushiki Kaisha, Nagasawa, Japan

[21] Appl. No.: 57,901

[22] Filed: Jul. 16, 1979

[30] Foreign Application Priority Data

Sep. 26, 1978 [JP] Japan ............................... 53-117425

[51] Int. Cl.³ ..................... C22C 38/44; C22C 38/46
[52] U.S. Cl. .................................... 148/39; 138/177; 148/15.5; 148/16.5
[58] Field of Search ................ 148/39, 15.5, 16.5; 138/177

[56] References Cited

U.S. PATENT DOCUMENTS

| | | | |
|---|---|---|---|
| 2,204,209 | 6/1940 | Davenport | 148/21.5 |
| 2,541,116 | 2/1951 | Somes | 89/14 |
| 2,804,413 | 8/1957 | Essig et al. | 148/19 |
| 3,661,656 | 5/1972 | Jarleborg | 148/12.1 |
| 3,891,474 | 6/1975 | Grange | 148/16.5 |
| 3,992,231 | 11/1976 | Timmons | 148/143 |
| 4,004,952 | 1/1976 | Jatczak et al. | 148/39 |
| 4,191,599 | 3/1980 | Stickels et al. | 148/16.5 |

OTHER PUBLICATIONS

Fuel Injection Tubing-SAE J529b (Standard), Report of Engine ... Committee, 1969, pp. 21.123-21.124.
Testing Techniques for Diesel Fuel Injection ... SAE-J969b, Report of Engine Committee, 1975, p. 24.91.
Physical Metallurgy Principle, Ed. Reed-Hill, Nostrand, N.Y., 1964, pp. 500-502.

Primary Examiner—L. DeWayne Rutledge
Assistant Examiner—Upendra Roy
Attorney, Agent, or Firm—Anthony J. Casella; Michael A. Stallman

[57] ABSTRACT

A high pressure fuel injection tubing material and a method of manufacturing the same wherein the inside surface of a fine diameter thick wall metal tube made of a single steel material is cemented, then the entire metal tube is heated and then immediately the outside surface is quenched or the inside surface is quickly heated and is then left to naturally cool so that the carbon content may gradually increase with the hardness distribution toward the inside surface from the outside surface of the wall thickness and a residual stress producing part in the peripheral direction may be formed.

The above mentioned injection tubing material is high in the pressure resistance and can be well guaranteed against cracking and breaking by vibrations or the like.

2 Claims, 2 Drawing Figures

HIGH PRESSURE FUEL INJECTION TUBING MATERIAL

BACKGROUND OF THE INVENTION

1. Field of the Invention

This invention relates to a high pressure fuel injection tubing material to be used generally for fuel feeding lines of diesel engines and to a method of manufacturing the same.

2. Description of the Prior Art

In the high pressure fuel injection tubing material in the prior art shown, for example, in "Fuel Injection Tubing"—SAE on pages 21.123 to 21.124 of the SAE Standards and "Testing Technique for Diesel Fuel Injection Systems"—SAE Recommended Practice on pages 24.91 to 24.96 of SAE Journal 969a, the hardened grain structure produced over the entire tube wall by cold drawing by repeatedly using dies and plugs is uniformly removed by tempering so that the carbon content and hardness distribution (of Hv=about 110 to 120) may be substantially uniform over the entire tube wall and no residual compression stress may be seen in the finally finished tube diameter to be used.

Therefore, due the actual state of the generation of numerous hair cracks on the inside surface with such repeated cold drawing works, the uniform structure by tempering the entire tubing material under the state of the final uniform carbon content distribution and the section structure in which no residual compression stress is present and, on the other hand, as a multiplied effect of the very high internal flow pressure in the recent tendency and the flow pressure variation and vibration variation repeated constantly by the operating state of the engine, the inside surface will be eroded by a cavitation, will be reduced in the smoothness and true circularity and will be locally cracked or broken by such erosion at last. At the same time, in order to prevent them and to secure safety, a large diameter tubing material with the increase of the wall thickness is inevitably forced to be used but the effect can not be well expected. Generally no sufficient mechanical property as of an injection tubing material can be secured and therefore the improvement has been constantly hoped for.

SUMMARY OF THE INVENTION

An object of the present invention is to provide a high pressure fuel injection tubing material and a method of manufacturing the same wherein the metal structure of the tube wall of a high pressure fuel injection tubing material of a fine tube diameter of about 6.0 to 30 mm and a thick wall of about 2.2 to 12.0 mm used mostly for fuel feeding pipe lines of conventional diesel engines is improved to effectively prevent a cavitation from being made by the flow pressure on the inside surface, to prevent cracks and breaks from being caused by the reduction of the smoothness (roughness) and true circularity of the wall surface by erosion and to increase the pressure resistances without enlarging the tube diameter by increasing the wall thickness and the mechanical properties against cracking and breaking by vibrations or the like are improved by a section structure of different metal structures distributed and formed over the inside and outside surfaces of the wall thickness.

The high pressure fuel injection tubing material according to the present invention is characterized in that the carbon content is gradually increased with the rise of the hardness distribution toward the inside surface from the outside surface of the wall thickness of a fine diameter thick metal tube made of a single steel material and a residual compression stress producing layer substantially in the peripheral direction is formed in the inside surface.

The method of manufacturing high pressure fuel injection tubing materials according to the present invention is characterized by comprising a step of cementing only the inside surface of the wall thickness of a fine diameter thick wall metal tube made of a single steel material, a step of heating the entire metal tube and a step of making a temperature difference so that the inside surface may be higher in the temperature than the outside surface.

Further objects, advantages and features of the present invention will become more fully apparent from a detailed consideration of the arrangement and construction of the constituent parts as set forth in the following specification taken together with the accompanying drawing.

DETAILED DESCRIPTION OF PREFERRED EMBODIMENTS

Figure 1:
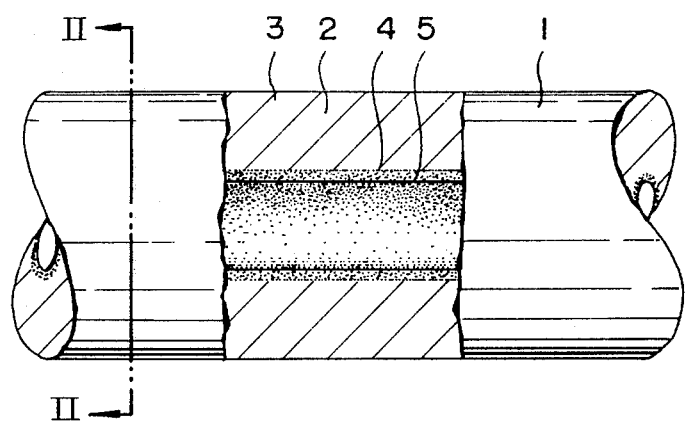
FIG. 1 is a partly sectioned side view of a high pressure fuel injection tubing material according to an embodiment of the present invention.
Figure 2:
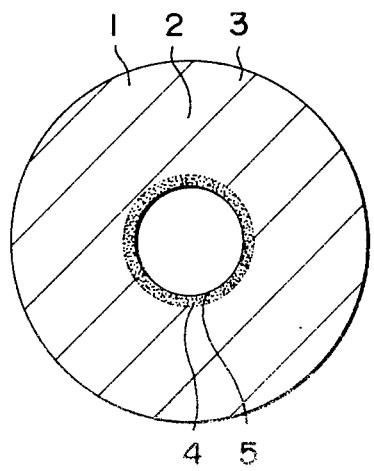
FIG. 2 is a sectioned view on line II—II in FIG. 1.

In the drawings, only the inside surface 4 side of the wall thickness 2 of an injection tubing material 1 consisting of a fine diameter thick wall metal tube of a tube diameter of about 6.0 to 30 mm and wall thickness of about 2.2 to 12.0 mm made of a single steel material is cemented and then the entire tubing material 1 is heated and is then immediately quenched from the outside surface 3 side or, after such cementation, only the inside surface 4 side is quickly heated by high frequency induction heating or the like and is then left to naturally cool. A compact crystal structure high in the carbon content with the rise of the hardness distribution making the inside surface 4 have Hv=about 150 to 230 toward the inside surface 4 from the outside surface 3 side of the wall thickness 2 of the tubing material and having a residual compression stress producing layer 5 particularly in the peripheral direction including the length-wise axial direction can be formed by this treatment.

As regards the production of these residual compression stresses, the tubing material is of two phases consisting of ferrite and pearlite but only the inside surface 4 side high in the carbon content with the rise of the hardness distribution is formed to be of two phases consisting of martensite and troostite by the above mentioned treatment and therefore the producing part 5 is produced only on the inside surface 4 side by the multiplied effect of the expansion difference of these different metal structures and the temperature difference upon quenching. Thus, the carbon content with the rise of the hardness distribution is gradually higher from the outside surface 3 side to the inside surface 4. Further, as the tubing material is formed of the compact crystal structure having the residual compression stress producing part 5 in the peripheral direction, the cavitation by the flow pressure on the inside surface 4 can be effectively prevented, the cracking and breaking with the reduction of the smoothness (roughness) and true circularity of the inside surface by erosion can be prevented, the pressure resistance can be well increased without increasing the tube diameter by increasing the wall thickness and the mechanical properties against cracking and breaking by vibrations or the like can be improved and well secured by the section structure of different metal structures distributed and formed in the inside and outside surfaces of the wall thickness 2. Thus the present invention is very industrially useful.

While the present invention has been described with reference to particular embodiments thereof, it will be understood that numerous modifications may be made by those skilled in the art without actually departing from the spirit and scope of the invention as defined in the appended claims.

I claim:

1. A high pressure fuel injection tubing material comprising:
   a steel tube having a fine inner bore, said tube having an outer diameter of about 6 to 30 millimeters and a wall thickness of about 2.2 to 12 millimeters, and wherein only the inside surface of said tube includes a hardness layer contiguous therewith and extending radially outwardly a distance of approximately 13% of the wall thickness, said inside surface having a hardness distribution of approximately 150 to 230 HV, whereby the unwanted cavitation and cracking of the inner surface due to high pressure fuel injection is reduced, while substantially maintaining the mechanical properties of the steel tube.

2. The tubing material according to claim 1 wherein said inside surface is made of two phases consisting of martensite and troostite.

* * * * *